US009953346B2

(12) United States Patent
Mangalvedkar et al.

(10) Patent No.: US 9,953,346 B2
(45) Date of Patent: Apr. 24, 2018

(54) SYNCHRONIZATION OF HOME SHOPPING CARTS WITH ADVERTISEMENTS

(75) Inventors: Amit M. Mangalvedkar, Bangalore (IN); Sivananthan Perumal, Bangalore (IN); Dhandapani Shanmugam, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 490 days.

(21) Appl. No.: 13/483,913

(22) Filed: May 30, 2012

(65) Prior Publication Data
US 2013/0325568 A1 Dec. 5, 2013

(51) Int. Cl.
*G06Q 30/02* (2012.01)
(52) U.S. Cl.
CPC .................. *G06Q 30/0269* (2013.01)
(58) Field of Classification Search
USPC ........... 705/14.41–14.73, 26.1–27.1
See application file for complete search history.

(56) References Cited

U.S. PATENT DOCUMENTS

| | | | | |
|---|---|---|---|---|
| 6,131,812 A * | 10/2000 | Schneider | G01G 19/56 | 235/375 |
| 6,204,763 B1 * | 3/2001 | Sone | A47G 29/141 | 221/2 |
| 6,430,541 B1 * | 8/2002 | Brown | G06Q 10/087 | 705/28 |
| 6,934,592 B2 * | 8/2005 | Hood | D06F 39/005 | 68/12.27 |
| 7,237,252 B2 * | 6/2007 | Billmaier | G06F 1/3203 | 348/E5.006 |
| 7,340,414 B2 * | 3/2008 | Roh | G06Q 20/203 | 340/595 |
| 7,430,753 B2 * | 9/2008 | Gray | H04N 7/15 | 348/E7.054 |
| 7,448,546 B2 * | 11/2008 | Jung | G06Q 10/087 | 235/375 |
| 7,907,054 B1 * | 3/2011 | Nguyen | F25D 29/00 | 340/3.1 |
| 7,979,309 B1 * | 7/2011 | Stevens | G06Q 10/087 | 705/26.7 |
| 8,667,112 B2 * | 3/2014 | Roth | H04L 12/282 | 709/206 |

(Continued)

OTHER PUBLICATIONS

Z. Davis, et al., A Personal Handheld Multi-Modal Shopping Assistant, ICNS 2006 Proceedings of the International Conference on Networking and Services, 2006, pp. 1-9 (plus 1 citation page added), IEEE Computer Society Washington, DC, USA.

(Continued)

*Primary Examiner* — Jeff Zimmerman
(74) *Attorney, Agent, or Firm* — Lee Law, PLLC; Christopher B. Lee

(57) ABSTRACT

Advertisement content is received at a processor that manages inventory of a smart home appliance from an advertising distribution device within a home network. A determination is made to add an advertised item of the advertisement content to a spoke shopping cart based upon commodity data of the managed inventory of the smart home appliance. The advertised item is added to the spoke shopping cart.

20 Claims, 7 Drawing Sheets

(56) References Cited

U.S. PATENT DOCUMENTS

| | | | | |
|---|---|---|---|---|
| 2002/0120502 | A1* | 8/2002 | Sakaguchi | G06Q 30/02 705/14.49 |
| 2002/0194604 | A1* | 12/2002 | Sanchez | G06Q 30/06 725/60 |
| 2004/0138949 | A1* | 7/2004 | Darnton | G06Q 30/02 705/14.69 |
| 2004/0151860 | A1* | 8/2004 | Shah | B42D 5/003 428/40.1 |
| 2008/0046331 | A1* | 2/2008 | Rand | G06O 30/00 705/26.81 |
| 2009/0007171 | A1* | 1/2009 | Casey | G06Q 30/02 725/34 |
| 2009/0031355 | A1* | 1/2009 | Gray | H04N 7/15 725/47 |
| 2009/0254446 | A1* | 10/2009 | Chernyak | G06Q 30/06 705/26.1 |
| 2010/0070338 | A1* | 3/2010 | Siotia | G06Q 10/087 705/7.31 |
| 2010/0106521 | A1* | 4/2010 | Ashrafzadeh | G06F 19/3462 705/3 |
| 2010/0268595 | A1* | 10/2010 | Littrell | G06Q 30/00 705/14.49 |
| 2011/0238522 | A1* | 9/2011 | Stevens | G06Q 10/087 705/26.4 |
| 2012/0101876 | A1* | 4/2012 | Turvey | G06Q 30/02 705/14.1 |
| 2012/0158516 | A1* | 6/2012 | Wooten, III | G06Q 30/0269 705/14.66 |
| 2012/0174149 | A1* | 7/2012 | Reynolds | G06Q 30/02 725/31 |
| 2012/0260683 | A1* | 10/2012 | Cheon | F25D 29/00 62/125 |
| 2014/0052573 | A1* | 2/2014 | Oh | G06Q 10/10 705/26.8 |

OTHER PUBLICATIONS

Author Unknown, Method and apparatus to enable automatic grocery list generation by semantic interpretation based on speech recognition, Disclosure #IPCOM000198063D, Jul. 24, 2010, p. 1, IP.com, Published at: http://ip.com/IPCOM/000198063.

Author Unknown, Home Inventory System, Disclosure #IPCOM000182407D, Apr. 29, 2009, p. 1, IP.com, Published at: http://ip.com/IPCOM/000182407.

G. Roussos, et al., Designing appliances for mobile commerce and retailtainment, Journal: Personal and Ubiquitous Computing, Jul. 2003, pp. 203-209 (plus 1 citation page added), vol. 7, No. 3-4, Birkbeck ePrints, London, UK, also Published at: http://dl.acm.org/citation.cfm?id=950513.

* cited by examiner

SYNCHRONIZATION OF HOME SHOPPING CARTS WITH ADVERTISEMENTS

BACKGROUND

The present invention relates to home shopping carts. More particularly, the present invention relates to synchronization of home shopping carts with advertisements.

Home automation provides interconnection and control capabilities for certain home appliances. For example, air conditioners, heaters, lights, and other appliances may be controlled remotely (e.g., turn on, turn off). This control may be performed remotely using a computer or a mobile device, such as a cellular telephone.

BRIEF SUMMARY

A method includes receiving, at a processor that manages inventory of a smart home appliance, advertisement content from an advertising distribution device within a home network; determining, based upon commodity data of the managed inventory of the smart home appliance, to add an advertised item of the advertisement content to a spoke shopping cart; and adding the advertised item to the spoke shopping cart.

A system includes a memory and a processor programmed to receive advertisement content from an advertising distribution device within a home network; determine, based upon commodity data of managed inventory of a smart home appliance, to add an advertised item of the advertisement content to a spoke shopping cart stored within the memory; and add the advertised item to the spoke shopping cart.

A computer program product includes a computer readable storage medium including computer readable program code, where the computer readable program code when executed on a computer causes the computer to receive advertisement content from an advertising distribution device within a home network; determine, based upon commodity data of managed inventory of a smart home appliance, to add an advertised item of the advertisement content to a spoke shopping cart; and add the advertised item to the spoke shopping cart.

DETAILED DESCRIPTION

Figure 1:
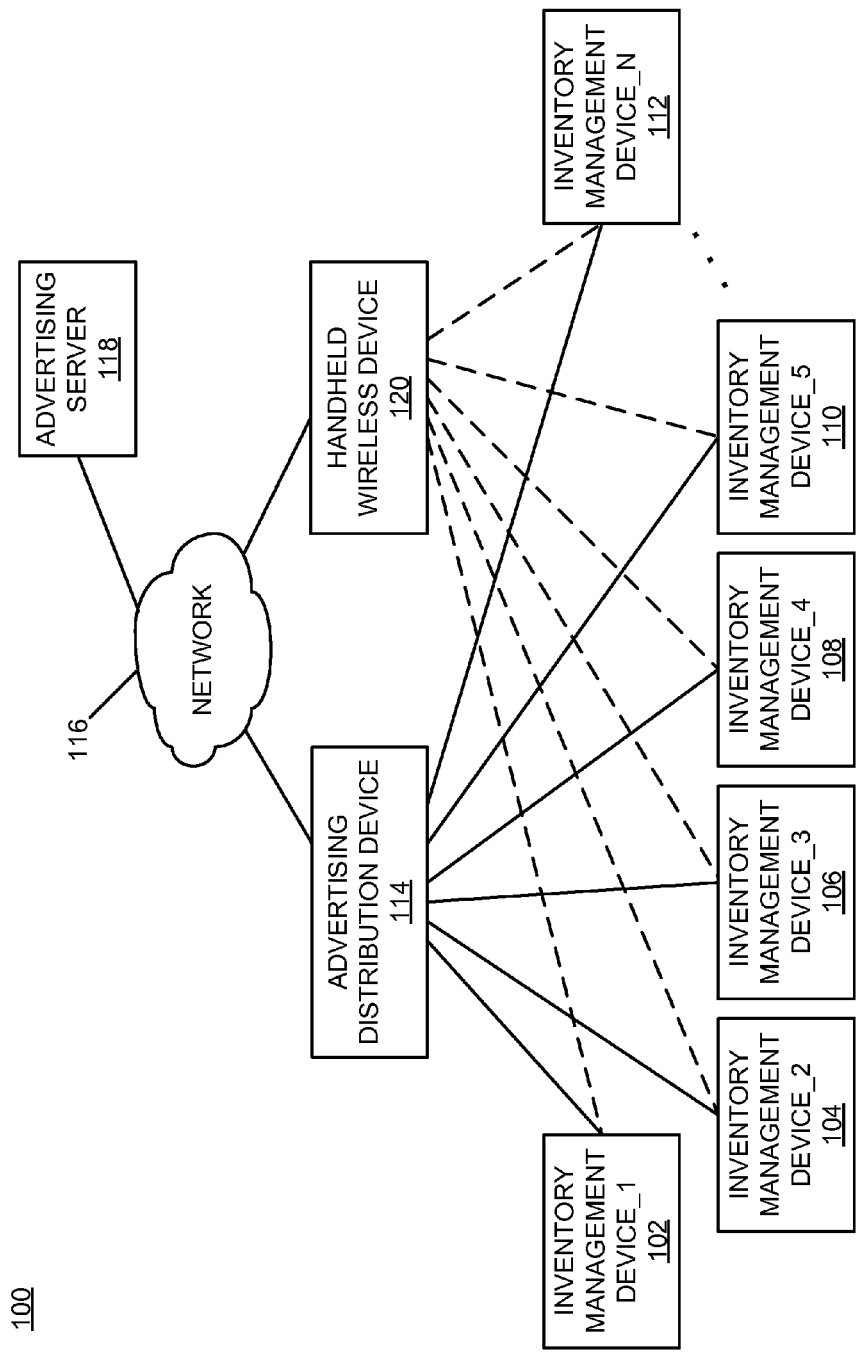
FIG. 1 is a block diagram of an example of an implementation of a system for automated synchronization of home shopping carts with advertisements according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides synchronization of home shopping carts with advertisements. An advertising distribution device within a home network (e.g., a set-top-box (STB), or other device) implements a publish/subscribe protocol for distribution of advertisement content to inventory management devices that manage inventory of smart home appliances within a home environment. The advertising distribution device further subscribes with one or more advertising servers to receive advertisement content based upon current subscriptions of the inventory management devices, and receives and distributes (e.g., pushes) advertisement content to the smart home appliances. The smart home appliances process the advertisement content and add items to spoke shopping carts within the home appliances using a rule engine that compares, for example, the discounts offered with current inventory. A hub shopping cart device, such as a mobile phone or other handheld device, consolidates the spoke shopping carts of the different smart home appliances into a hub shopping cart. The hub shopping cart is configured with a shopping travel route based upon purchase location information associated with items in the hub shopping cart and guides the consumer during a shopping trip to purchase the respective items on the hub shopping cart.

The present technology provides for intelligent interconnection of intelligent or smart home appliances with live or near-live advertisement content (e.g., advertisements, discounts, promotions, new products, etc.). For purposes of the present description, intelligent or smart home appliances may be considered any appliance or area of a home that is configured to programmatically process inventory for the respective area and/or to document items that are to be purchased. For example, intelligent or smart home appliances as described herein may include, among other appliances, a refrigerator, a wardrobe, a grocery shelf/pantry, a bathroom, a clothes wash room, a home office, etc. These intelligent or smart home appliances will be referred to herein in the alternative, or generally as "smart home appliances" or "home appliances," as convenient for purposes of the particular portion of the description below.

Individual shopping carts are managed by the respective smart home appliances. These individual shopping carts are referred to herein as "spoke shopping carts." A consumer's computer or mobile device may automatically synchronize with the spoke shopping carts of the respective smart home appliances to configure a consolidated shopping cart. The consolidated shopping cart is referred to herein as a "hub shopping cart." As such, the home appliances manage spoke shopping carts that are synchronized and consolidated via the hub shopping cart for use by consumers during shopping events and outings.

As advertisement content is broadcasted within an audio and/or video stream, it may be received by, for example, a television associated with a smart home environment, and the advertisement content may be distributed and stored within the spoke shopping cart(s) of those respective home appliances. The spoke shopping carts may be configured to respond to advertisement content for particular items or types of items for which the respective home appliances are configured to manage an inventory. The addition of items to the spoke shopping carts may be performed by a rule engine in the smart home appliances that is configured based upon seasonal considerations, product availability, the discount offered, comparison of discounts among multiple vendors, proximity/location of the vendor, and other factors as appropriate for a given implementation. By leveraging the smart home environment, the present technology provides an intelligent consolidated hub shopping cart in a mobile device by synchronizing spoke shopping carts from the respective home appliances. The mobile device may be configured to poll and consolidate the commodity data from the respective home appliances. The consolidation of the spoke shopping carts may be performed by a rule engine in the mobile device that is configured based upon seasonal considerations, product availability, the discount offered, comparison of discounts among multiple vendors, proximity/location of the vendor, and other factors as appropriate for a given implementation. The consumer may then utilize the mobile device during a shopping trip to collect the items to be purchased based upon discounts and locations of the respective discounts. As such, the present technology may be utilized to increase discount utilization (e.g., cost efficiency).

As such, the intelligent and interconnected home appliances are configured to maintain up-to-date/current information about commodities and restocking goals, and are configured to recognize purchase opportunities and reorder based upon available promotions and/or discounts. Using the present technology, a more convenient shopping experience may be provided for customers and time may be saved. Additionally, increased view rate (or consumption rate) of the advertisement content may be realized by advertisers, the promoted advertising content may be more readily converted into sales, and targeted promotions by advertisers may be more readily achieved. Further, increased revenue may be realized by retailers and consumer products companies, while increasing consumer loyalty and satisfaction, which may further improve brand recognition among consumers.

The present subject matter may be implemented as a subscription-based technology between advertisers and consumers, where consumers subscribe to certain types of advertisement content based upon their product use preferences. As part of the subscription and to obtain discounts on particular products, consumers may agree to watch/tune to certain television channels during certain times. Advertisement content may be automatically/programmatically captured by the respective home appliances for which inventory maintenance of advertised products is configured. As such, the present subject matter may be utilized to push live or near-live advertisement content from the television or other advertisement content source to intelligent home appliances based upon the consumer's subscription.

The subscription-based technology may further be enhanced by automated distribution within the home environment. For example, a consumer's television set-top-box (STB) may be configured as a publish/subscribe hub within the smart home environment. The STB may be configured with detailed subscription information associated within inventory managed and maintained by each of the different home appliances. In response to receipt of advertisement content, the STB may analyze the received advertisement content to determine the types/brands of products that are advertised. The STB may then selectively distribute (e.g., by filtering or other techniques) the received advertisement content based upon the home appliance subscriptions to the respective home appliance(s) for which the advertisement content is relevant. It should be noted that the advertisement content may be distributed to the home appliances without selective distribution/filtering by the STB, and the respective home appliances may be configured to process the entire advertisement content, as appropriate for a given implementation.

In response to receipt of the selectively distributed advertisement content or the entire advertisement content, the home appliances may process the advertisement content against the configured inventory targets/goals for the respective home appliance. The home appliance may then determine based upon the inventory targets/goals (e.g., by filtering or other techniques) whether the advertisements, discounts, promotions, new products, or other advertisement content are appropriate for placement on the spoke shopping cart for ordering (or for consideration by the consumer, for example, in the case of new products).

The configured inventory items may be referred to herein as "commodity data." The commodity data represents inventory items and amounts of those inventory items that are currently in stock with the home appliances and inventory items and amounts that are to be replenished/replaced based upon current inventory or absence of inventory (e.g., out of stock).

The home appliances may be configured to automatically/programmatically determine current inventory. For example, particular slots in a refrigerator may be utilized for milk, cheese, eggs, sandwich spread, and other inventory items. These slots may be configured with a scale that weighs the current amount of inventory on hand. When the inventory decreases to a configured reorder level/threshold, the inventory item may be triggered by the home appliance for reordering. Additionally, variances may be configured for the configured reorder levels/thresholds to flag reordering where an inventory item is within a configured percentage or amount of a configured reorder level/threshold and advertising content that is received indicates that reordering during a particular time frame may save money for repurchase of the respective inventory item(s).

Additionally, the home appliances may be configured to automatically/programmatically process shelf life dates for products (e.g., milk, cheese, eggs, etc.) to allow reordering if the shelf life of the particular product has expired, or is about to expire. This shelf life information may be included in the spoke shopping cart, and, during synchronization, consolidated to the hub shopping cart.

Inventory item (reorder item) purchase/availability location information may be processed in association with reordering at the spoke shopping carts. This purchase/availability location information may be processed as part of the consolidation processing via the hub shopping cart to determine efficient travel distances and travel routes for the consumer to acquire the respective inventory items to be purchased. For example, a user's mobile device that is hosting the hub shopping cart may be configured to determine travel routes for shopping trips using the purchase/availability location information of the set of inventory items to be acquired during a particular shopping trip. This determination of travel routes may be performed using map information in association with address information or global positioning satellite (GPS) information, or otherwise as appropriate for a given implementation. As such, the consumer's travel time, travel distance, shopping time, and shopping costs may also be improved by use of the present technology.

It should be noted that conception of the present subject matter resulted from recognition of certain limitations associated with conventional home shopping. First, it was observed that people generally utilize manual paper shopping lists that they generate between shopping trips, and that they may keep notes on appliances with a manual listing of items needed (e.g., milk for a refrigerator, laundry detergent for a washing machine, etc.). Additionally, it was observed that advertisers are limited in their attempts to communicate with potential customers because they are often not available or not watching television, for example, when advertisements are transmitted. Further, it was observed that even where consumers are exposed to advertisements, the consumers may not update their shopping lists. It was also observed that, even where consumers collect all of the notes from the respective appliances, they may not consolidate the notes into a shopping list based upon where to shop for the best discounts on the items they intend to purchase. The present subject matter improves consumer shopping and costs, and improves advertising effectiveness, by providing for intelligent and interconnected home appliances that receive and process advertisements/discounts based upon inventory items that are configured within the respective home appliances for replacement/replenishment. The home appliances further generate a consolidated shopping list based upon the inventory to be replenished within the respective appliances, the available discounts, and the locations where the items subject to the available discounts may be purchased, as described above and in more detail below. As such, improved home shopping efficiency may be obtained through use of the present technology for synchronization of home shopping carts with advertisements.

The synchronization of home shopping carts with advertisements described herein may be performed in real time to allow prompt updates by appliances of inventory items that are out of stock or that are configured for replacement, and updates of consolidated shopping lists. For purposes of the present description, real time shall include any time frame of sufficiently short duration as to provide reasonable response time for information processing acceptable to a user of the subject matter described. Additionally, the term "real time" shall include what is commonly termed "near real time" generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated synchronization of home shopping carts with advertisements. Several inventory management devices are illustrated. An inventory management device_1 102, an inventory management device_2 104, an inventory management device_3 106, an inventory management device_4 108, an inventory management device_5 110, up to an inventory management device_N 112 are illustrated. It is understood that any number of inventory management devices may be used as appropriate for a given implementation. The inventory management devices 102 through 112 may each be configured to manage inventory for an enclosure or location, or multiple enclosures or locations as appropriate for a given implementation.

For purposes of the examples that follow, it is assumed that the inventory management device_1 102 is associated with an office or study-room supply cabinet/cupboard. It is also assumed that the inventory management device_2 104 is associated with a refrigerator. It is further assumed that the inventory management device_3 106 is associated with a bathroom supply cabinet/cupboard, that the inventory management device_4 108 is associated with a kitchen pantry/cupboard, and that the inventory management device_5 110 is associated with a washroom or laundry room cabinet/cupboard. The remaining inventory management devices through the inventory management device_N 112 may be considered to be associated with other appliances, though the delineation above provides appropriate foundation for the examples that follow.

Each of the inventory management devices 102 through 112 implement a spoke shopping cart as described above and manage inventory for the respective location. The inventory management devices 102 through 112 interconnect via a communication distribution network (illustrated using solid interconnection lines), such as a home wired network or home wireless network, with an advertising distribution device 114 to receive advertisements. The advertising distribution device 114 may be implemented as a set-top-box (STB) or other communication device within a home environment serviced by the home network.

The advertising distribution device 114 communicates via a network 116 with an advertising server 118 to receive and/or retrieve advertisements that include advertisement content. Though only one advertising server 118 is illustrated for ease of illustration purposes, there may be many advertising servers implemented as appropriate for a given implementation, such as one or more advertising servers associated with each advertising entity.

The network 116 may include any form of interconnection suitable for the intended purpose, including a private or public network such as an intranet or the Internet, respectively, direct inter-module interconnection, dial-up, wireless, or any other interconnection mechanism capable of interconnecting the respective devices. The network 116 may also include a satellite connection, cable connection, or other network interconnection, as appropriate for a given implementation.

As described above, the advertising distribution device 114 may subscribe to advertisements from the advertising server 118 on behalf of the respective inventory management devices 102 through 112 for a range of products, promotions, and other advertising content. In such an implementation, the inventory management devices 102 through 112 may subscribe with the advertising distribution device 114 for advertisement content for specific products associated with the inventory managed by the respective inventory management devices. Alternatively, the inventory management devices 102 through 112 may directly subscribe to advertisements with the advertising server 118, as appropriate for a given implementation. Within either implementation, the advertising distribution device 114 may operate as a distribution hub for advertisement content based upon advertisement content "category types" defined/specified in association with advertisement content, as described in more detail below.

A handheld wireless device 120 operates to consolidate the spoke shopping carts of the respective inventory management devices 102 through 112. As such, the handheld wireless device 120 implements the hub shopping cart within the present example. For purposes of the present description, the handheld wireless device 120 is considered a "hub shopping cart device" in view of it implementing the hub shopping cart technology described herein.

The handheld wireless device 120 communicates with the respective inventory management devices 102 through 112 via any communication technology/protocol appropriate for a given implementation (illustrated using dashed interconnection lines). For example, the handheld wireless device 120 may communicate with the inventory management device 102 through 112 using protocols such as Bluetooth®, infrared (IR), or near field communication (NFC), wired interconnection using a cradle to a wired home network, or other technology as appropriate for a given implementation.

The handheld wireless device 120 may also communicate with the advertising server 118, such as via a wireless implementation or wired connection (e.g., cradle-connection) to the network 116. In such an implementation, the handheld wireless device 120 may also operate to subscribe to and distribute advertising content to the inventory management devices 102 through 112. In such an implementation, the handheld wireless device 120 may communicate via wireless or wired communication technology with the advertising server 118.

As will be described in more detail below in association with FIG. 2 through FIG. 6, the devices illustrated within FIG. 1 provide automated synchronization of home shopping carts with advertisements. The automated synchronization of home shopping carts with advertisements is based upon inventory management using spoke shopping carts by the respective inventory management devices 102 through 112, and consolidation of the spoke shopping carts into a hub shopping cart by the handheld wireless device 120. As described above, the synchronization of home shopping carts with advertisements may be based upon a variety of publish/subscribe technologies or may be implemented without subscriptions as appropriate for a given implementation.

It should be noted that the inventory management devices 102 through 112 may be any computing device capable of processing information as described above and in more detail below. For example, the inventory management devices 102 through 112 may include embedded controller devices and/or devices such as a personal computer (e.g., desktop, laptop, tablet computing device, e-book reading device, etc.) that retrieve information from embedded controllers that process inventory measurements.

It should also be noted that the handheld wireless device 120 may be a portable computing device, either by a user's ability to move the handheld wireless device 120 to different locations, or by the handheld wireless device 120's association with a portable platform, such as a plane, train, automobile, or other moving vehicle. It should also be noted that the handheld wireless device 120 may be any computing device capable of processing information as described above and in more detail below. For example, the handheld wireless device 120 may include devices such as a cellular telephone, personal digital assistant (PDA), email device, tablet computing device, e-book reading device, music recording or playback device, watch, or any other device capable of processing information as described in more detail below.

Figure 2:
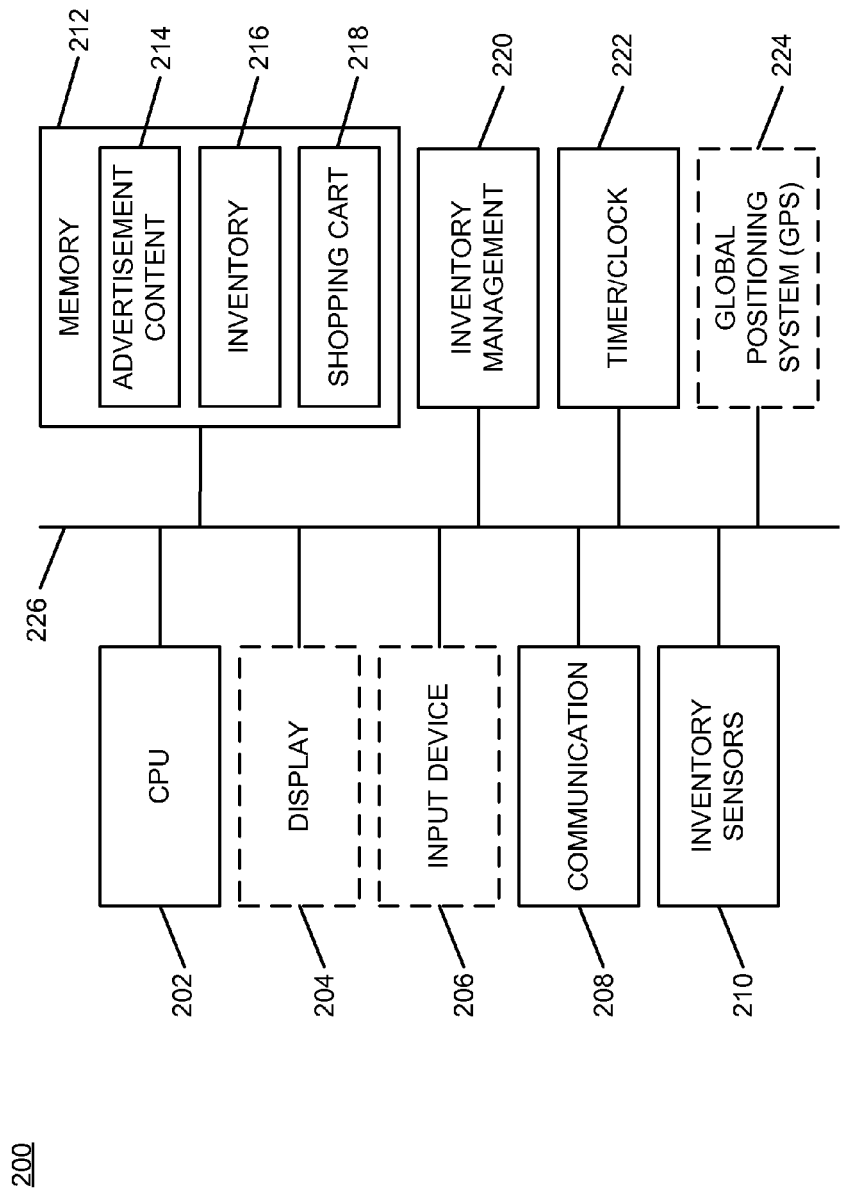
FIG. 2 is a block diagram of an example of an implementation of a core processing module capable of performing automated synchronization of home shopping carts with advertisements according to an embodiment of the present subject matter.

FIG. 2 is a block diagram of an example of an implementation of a core processing module 200 capable of performing automated synchronization of home shopping carts with advertisements. The core processing module 200 may be associated with any of the inventory management devices 102 through 112, the advertising distribution module 114, the advertising server 118, and the handheld wireless device 120, as appropriate for a given implementation. It should be noted that certain of the modules described below may be implemented in association with one or more of the devices described above in association with FIG. 1. Differentiation between the respective modules described below in association with the core processing module 200 and the devices described above in association FIG. 1 is omitted in certain cases for brevity. However, it is understood that the description of the functionality of the modules described below may be used to appropriately locate the respective modules and components as appropriate for a given implementation.

Further, the core processing module 200 may provide different and complementary processing of advertising content and/or inventory management in association with each implementation, as described in more detail below. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities as appropriate for the given implementation. The communication module 208 may also implement near field communications technology for consolidation of spoke shopping carts when implemented in association with the handheld wireless device 120, for example.

Inventory sensors 210 include scales, bar-code readers, cameras, and any other form of sensor usable to monitor, track, and update inventory in association with the inventory management devices 102 through 112. The information received/derived from the inventory sensors 210 may be used to create and update the spoke shopping carts of the inventory management devices 102 through 112.

A memory 212 includes an advertisement content storage area 214 that stores advertisement content within the core processing module 200. The advertising content may include deals/discounts, sales, promotions, store locations/brands, and any other advertising content appropriate for a given implementation.

An inventory information storage area 216 stores the inventory information for the inventory management devices 102 through 112. The inventory information may include current inventory totals (e.g., inventory items, weights, expiration dates, etc.), inventory items to be reordered (e.g., purchase intervals/frequency, etc.), filtered advertising content, and any other inventory information appropriate for a given implementation.

A shopping cart storage area 218 stores shopping cart information including items/information distributed within advertising content to be purchased and other information. The shopping cart storage area 218 may store spoke shopping carts for the inventory management devices 102 through 112 and may store a hub shopping cart for the handheld wireless device 120.

It is understood that the memory 212 may include any combination of volatile and non-volatile memory suitable for the intended purpose, distributed or localized as appropriate, and may include other memory segments not illustrated within the present example for ease of illustration purposes. For example, the memory 212 may include a code storage area, an operating system storage area, a code execution area, and a data area without departure from the scope of the present subject matter.

An inventory management module 220 is also illustrated. The inventory management module 220 provides inventory management and advertising content processing for the core processing module 200, as described above and in more detail below. The inventory management module 220 implements the automated synchronization of home shopping carts with advertisements of the core processing module 200. The inventory management module 220 may operate to manage spoke shopping carts where implemented in association with an inventory management device and may manage consolidation of spoke shopping carts where implemented in association with a handheld wireless device. As described above, addition of items to the spoke shopping carts and/or the consolidation of the spoke shopping carts into the hub shopping cart may be performed by a rule engine in the inventory management module 220 that is configured based upon seasonal considerations, product availability, the discount offered, comparison of discounts among multiple vendors, and other factors as appropriate for a given implementation.

It should also be noted that the inventory management module 220 may form a portion of other circuitry described without departure from the scope of the present subject matter. Further, the inventory management module 220 may alternatively be implemented as an application stored within the memory 212. In such an implementation, the inventory management module 220 may include instructions executed by the CPU 202 for performing the functionality described herein. The CPU 202 may execute these instructions to provide the processing capabilities described above and in more detail below for the core processing module 200. The inventory management module 220 may form a portion of an interrupt service routine (ISR), a portion of an operating system, a portion of a browser application, or a portion of a separate application without departure from the scope of the present subject matter.

A timer/clock module 222 is illustrated and used to determine timing and date information, such as expiration date information for inventory and advertising content deal expiration times/dates, as described above and in more detail below. As such, the inventory management module 220 may utilize information derived from the timer/clock module 222 for information processing activities, such as the automated synchronization of home shopping carts with advertisements.

A global positioning system (GPS) module 224 provides positioning location coordinates usable for identifying locations of stores associated with advertising content and other location information as appropriate for a given implementation. The GPS module 224 is illustrated in a dashed-line representation to represent that it may be implemented within the handheld wireless device 120. As such, location identification information generated by the GPS module 224 and used in association with a hub shopping cart may be stored within the shopping cart storage area 218 for use by the handheld wireless device 120 during a shopping event to expedite the shopping experience for the consumer.

The CPU 202, the display 204, the input device 206, the communication module 208, the inventory sensors 210, the memory 212, the inventory management module 220, the timer/clock modules 222, and the GPS module 224 are interconnected via an interconnection 226. The interconnection 226 may include a system bus, a network, or any other interconnection capable of providing the respective components with suitable interconnection for the respective purpose.

Though the different modules illustrated within FIG. 2 are illustrated as a component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at an appliance, kiosk, or other location, while the CPU 202 and memory 212 may be located at a local or remote server. Many other possible arrangements for components of the core processing module 200 are possible and all are considered within the scope of the present subject matter. Accordingly, the core processing module 200 may take many forms and may be associated with many platforms.

Within the context of the architectural considerations described above, the following example provides one possible configuration for automated synchronization of home shopping carts with advertisements. As described above, the advertising distribution device 114 may subscribe to advertisements from the advertising server 118. The advertising distribution device 114 may distribute the advertisements and/or the embedded advertising content of the advertisements via a variety of processes (e.g., subscription-based distribution or non-subscription-based distribution) to one or more of the inventory management device_1 102 through inventory management device_N 112.

For purposes of the present example, as described above, the inventory management device_1 102 through inventory management device_5 110 are each associated with one respective home appliance (or inventory storage location). As described above, it is assumed that the inventory management device_1 102 is associated with an office or study-room supply cabinet/cupboard. It is also assumed that the inventory management device_2 104 is associated with a refrigerator. It is further assumed that the inventory management device_3 106 is associated with a bathroom supply cabinet/cupboard, that the inventory management device_4 108 is associated with a kitchen pantry/cupboard, and that the inventory management device_5 110 is associated with a washroom or laundry room cabinet/cupboard. The remaining inventory management devices through the inventory management device_N 112 may be considered to be associated with other appliances, though the delineation above provides appropriate foundation for the examples that follow.

Five category types for goods are defined within the present example, though it is understood that any number of category types may be utilized as appropriate for a given implementation. The following types represent goods under inventory control (e.g., stored and replenished) within the respective storage locations managed by the respective inventory management devices (e.g., devices 102 through 110 within the present example), as described above.

Goods, such as stationery and other items (e.g., pencils, paper, toner, notebooks, etc.), stored within the office or study-room supply cabinet/cupboard are represented with "Category Type=Stationery." Goods, such as perishable grocery goods, stored within the refrigerator are represented with "Category Type=Perishables." Goods, such as toiletries, stored within the bathroom supply cabinet/cupboard are represented with "Category Type=Toiletries." Goods, such as non-perishable grocery goods, stored within the kitchen pantry/cupboard are represented with "Category Type=Grocery." Goods, such as washing/cleaning supplies (detergents, soaps, washing powder, etc.) stored within the washroom or laundry room cabinet/cupboard are represented with "Category Type=Soap."

The advertisement content within an advertisement will alternatively be referred to below as "commodity data." As described above, each of the inventory management devices 102 through 112 maintains its own spoke shopping cart. The spoke shopping cart maintains its own master list of commodities that are managed and that are to be re-stocked using commodity data. Each inventory management device may receive a feed from the advertising distribution device 114.

The following pseudo syntax represents one possible example of an advertisement formatted syntactically using a pseudo markup language (ML) format. Advertisement content/commodity data within the example advertisement may be received and processed within a home environment as described above and in more detail below.

```
<?xml version="1.0"?>
<advertisement>
    <category type="Soap">
        <commodity name="Detergent" brand="Brand_A">
            <retailer>Store_X</retailer>
            <location>Store_location</location>
            <quantity>5 pounds (lbs.)</quantity>
            <price>US$ 10.00</price>
            <deal>20%</deal>
            <schedule>Until July 29, 2012</schedule>
        </commodity>
    </category>
    <category type="Grocery">
        <commodity name="Olive Oil">
            <retailer>Store_Z</retailer>
            <location>Store_location</location>
            <quantity>1 Liter (Ltr.)</quantity>
            <price>US$ 5.00</price>
            <deal>5%</deal>
            <schedule>Until September 12, 2012</schedule>
        </commodity>
        <commodity name="Sugar" brand="Brand_C">
            <retailer>Store_X</retailer>
            <location>Store_location</location>
            <quantity>4 pounds (lbs.)</quantity>
            <price>US$ 2.00</price>
            <deal>25%</deal>
            <schedule>Until October 3, 2012</schedule>
        </commodity>
        <commodity name="Soft Drinks" brand="Brand_B">
            <retailer>Store_Y</retailer>
            <location>Store_location</location>
            <quantity>1 Liter (Ltr.)</quantity>
            <price>US$ 2.00</price>
            <deal>10%</deal>
            <schedule>Until August 29, 2012</schedule>
        </commodity>
    </category>
    <category type="Stationery">
        <commodity name="Notebook">
            <retailer>Store_W</retailer>
            <location>Store_location</location>
            <quantity>6</quantity>
            <price>US$ 10.00</price>
            <deal>30%</deal>
            <schedule>Until August 12, 2012</schedule>
        </commodity>
    </category>
    <category type="Perishables">
        <commodity name="Milk">
            <retailer>Store_Z </retailer>
            <location>Store_location</location>
            <quantity>1 Liter (Ltr.)</quantity>
            <price>US$ 1.00</price>
            <deal>5%</deal>
            <schedule>Until July 22, 2012</schedule>
        </commodity>
    </category>
    <category type="Toiletries">
        <commodity name="Tissue">
```

```
            <retailer>Store_X</retailer>
            <location>Store_location</location>
            <quantity>10 boxes</quantity>
            <price>US$ 2.00</price>
            <deal>15%</deal>
            <schedule>Until July 11, 2012</schedule>
        </commodity>
    </category>
</advertisement>
```

The advertisement content provides details related to the commodities (or new commodities) including discounts/promotions and other information usable to make purchase decisions. As described above, one or more advertisements that include the advertisement content may be published to one or more of the inventory management devices.

Additionally, the advertisement content includes purchase location information identified generally within the present example as a "Store_location." This purchase location information may include any information usable during a shopping trip to guide a consumer to purchase items within a hub shopping cart, such as physical addresses and/or GPS coordinates of the respective stores where the commodities may be purchased, and isle/shelf locations for the commodities to be purchased within the respective stores.

The advertising distribution device 114 may receive the advertisement formatted according to the above example pseudo syntax and forward the received advertisement to each of the inventory management devices 102 through 112. The respective inventory management devices may then receive the advertisement, filter the advertisement to retrieve the categorized information (advertisement content/commodity data), and store the commodity data against respective commodities under inventory management control.

Alternatively, as described above, the advertising distribution device 114 (e.g., set-top-box (STB), handheld wireless device, etc.) may operate using a publish/subscribe mechanism with the respective inventory management devices 102 through 112. The inventory management devices may subscribe to certain advertisements using commodity data, for example in the form of the category types described above (e.g., Stationery, Perishables, Toiletries, Grocery, Soap, etc.). In such an implementation, the advertising distribution device 114 may filter received advertisement syntax and extract advertisement content based upon commodity category types that include commodity data associated with the respective subscribed inventory management devices. The advertising distribution device 114 may then publish the filtered and extracted commodity data to the respective inventory management devices. Such processing directs specific categories of advertisements to specific inventory management devices. This granularity of processing may be used to improve adding of new appliances or modifying existing appliances, and adding and modifying categories of goods. Further, this granularity of processing results in no change in advertising content distribution from the broadcaster or merchandiser, which may improve scalability.

Referring to the example pseudo syntax above, the inventory management device_1 102 that is associated with the office or study-room supply cabinet/cupboard will process commodity data with "Category Type=Stationery." As such, within the pseudo syntax of the example above, the inventory management device_1 102 will process the commodity data for "<commodity name="Notebook">."

The inventory management device_2 104 that is associated with the refrigerator will process commodity data with "Category Type=Perishables." As such, within the pseudo syntax of the example above, the inventory management device_2 104 will process the commodity data for "<commodity name="Milk">."

The inventory management device_3 106 that is associated with the bathroom supply cabinet/cupboard will process commodity data with "Category Type=Toiletries." As such, within the pseudo syntax of the example above, the inventory management device_3 106 will process the commodity data for "<commodity name="Tissue">."

The inventory management device_4 108 that is associated with the kitchen pantry/cupboard will process commodity data with "Category Type=Grocery." As such, within the pseudo syntax of the example above, the inventory management device_4 108 will process the commodity data for "<commodity name="Olive Oil">," "<commodity name="Sugar" brand="Brand_C">," and "<commodity name="Soft Drinks" brand="Brand_B">." As this portion of the example illustrates, brands of products may be processed if the consumer prefers brand-specific inventory management, or brand processing may be omitted to take advantage of new product offerings within the respective categories.

The inventory management device_5 110 that is associated with the washroom or laundry room cabinet/cupboard will process commodity data with "Category Type=Soap." As such, within the pseudo syntax of the example above, the inventory management device_5 110 will process the commodity data for "<commodity name="Detergent" brand="Brand_A">."

Accordingly, each inventory management device may individually process commodity data within advertisement content of advertisements. Each inventory management device may enter items onto the respective spoke shopping cart based upon consumption rates for the respective products, current inventory, and available advertising offers/promotions.

When the consumer is ready for shopping, the hub shopping cart residing in the handheld wireless device 120 pulls the commodity data from the spoke shopping carts residing in the respective appliances (inventory management devices 102 through 112) using a protocol appropriate for the given implementation, such as Bluetooth®, infrared (IR), or near field communication (NFC).

The consolidation to the hub shopping cart is performed by a rule engine deployed as part of the mobile application. A few example factors that may be used to process the consolidation of the spoke shopping carts are availability of the commodity in the appliance, capacity of the appliance, demand for the commodity due to seasonal factors, varied consumption rate, shelf life of products, and other factors appropriate for the given implementation.

To ensure there is no duplication of the shopping, the present subject matter utilizes an alerting mechanism within each appliance to alert the downloader (consumer) with the download history details such as downloader name or identifier (ID), download time, and other details. For example, where a consumer Laura has already downloaded the spoke shopping cart from the refrigerator and consumer John subsequently tries to download the same shopping cart from the refrigerator, the refrigerator may provide a message indicating that "The spoke shopping cart has been downloaded by Laura at 3:00 PM on 12-MAY-2012."

After the shopping is completed, the commodities are stored within the respective appliances by the consumer(s).

The inventory management devices may scan bar codes associated with the commodities that include expiration date, weight, and other information as the commodities are stored within the appliances by the consumers. The inventory/commodity data stored within the inventory management devices of the respective appliances may be updated automatically with the quantity acquired for the respective commodity items. The consumer may further configure expiration date overrides (e.g., always re-stock milk weekly) or dates for re-acquisition of items.

FIG. 3 through FIG. 6 described below represent example processes that may be executed by devices, such as the core processing module 200, to perform the automated synchronization of home shopping carts with advertisements associated with the present subject matter. Many other variations on the example processes are possible and all are considered within the scope of the present subject matter. The example processes may be performed by modules, such as the inventory management module 220 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 3:
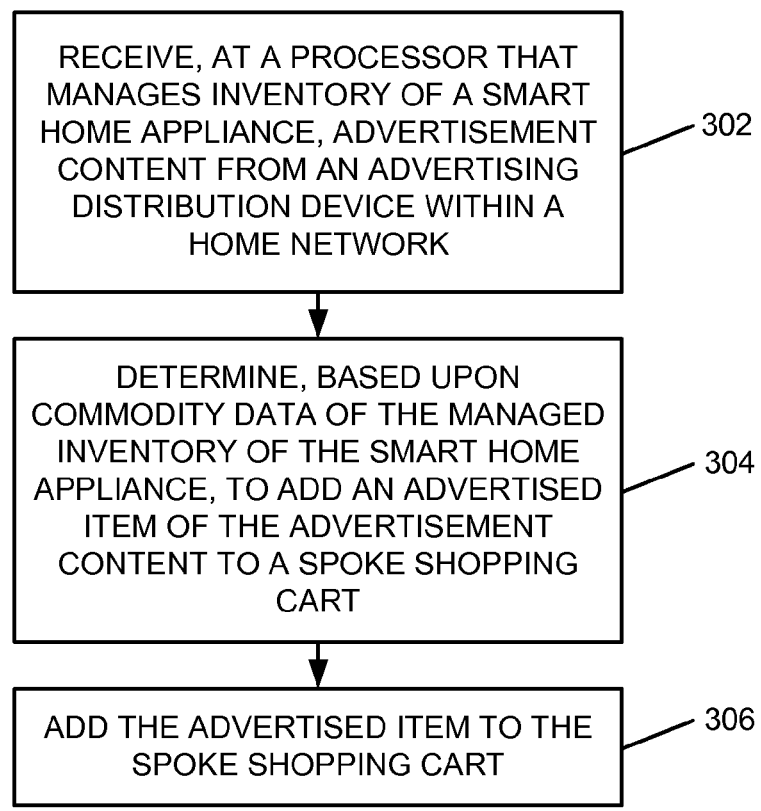
FIG. 3 is a flow chart of an example of an implementation of a process for automated synchronization of home shopping carts with advertisements according to an embodiment of the present subject matter.

FIG. 3 is a flow chart of an example of an implementation of a process 300 for automated synchronization of home shopping carts with advertisements. At block 302, the process 300 receives, at a processor that manages inventory of a smart home appliance, advertisement content from an advertising distribution device within a home network. At block 304, the process 300 determines, based upon commodity data of the managed inventory of the smart home appliance, to add an advertised item of the advertisement content to a spoke shopping cart. At block 306, the process 300 adds the advertised item to the spoke shopping cart.

Figure 4:
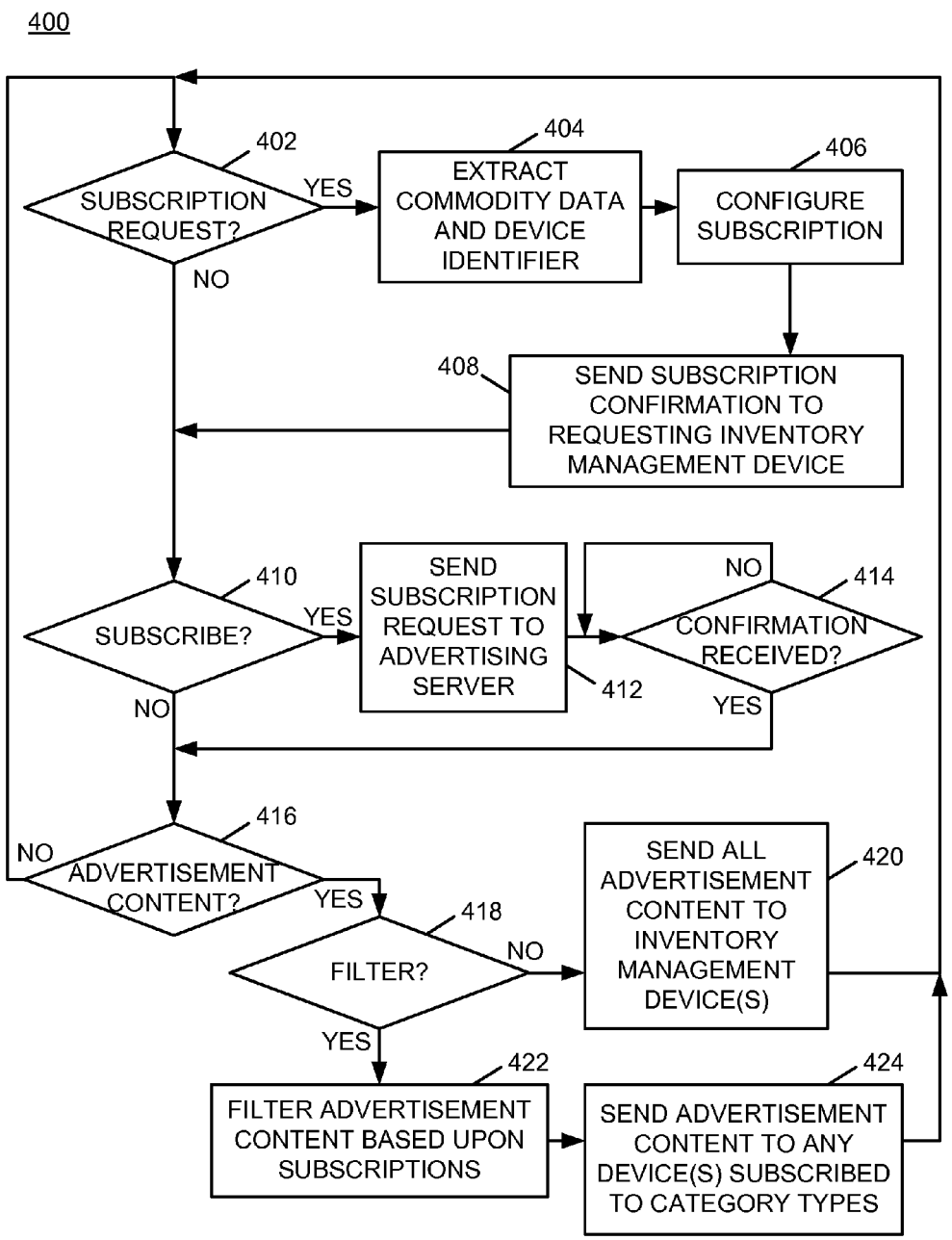
FIG. 4 is a flow chart of an example of an implementation of a process for automated synchronization of home shopping carts with advertisements by an advertising distribution device according to an embodiment of the present subject matter.

FIG. 4 is a flow chart of an example of an implementation of a process 400 for automated synchronization of home shopping carts with advertisements by an advertising distribution device, such as the advertising distribution device 114. As described above, an advertising distribution device may include, for example, a set-top-box (STB), and may also be a handheld wireless device, such as the handheld wireless device 120. As described above, the subject matter described herein may operate using subscriptions to advertisement content and may operate without using subscriptions to advertisement content. Additionally, the subject matter described herein may operate using a mixture of subscription and non-subscription based processing of advertisement content.

At decision point 402, the process 400 makes a determination as to whether a request to subscribe to advertisement content has been detected. A request to subscribe to advertising content may be detected/received, for example, from one of the inventory management device_1 102 through the inventory management device_N 112. The request to subscribe to advertising content may be generated by the respective inventory management devices in response to new product request configurations by a consumer, expiration or consumption of a product under inventory management, or otherwise as appropriate for a given implementation. In response to determining that a request to subscribe to advertising content has been detected, the process 400 extracts commodity data and a device identifier from the subscription request at block 404. As described above, the commodity data may include one or more category types that may be used by the advertising distribution device 114 to subscribe to advertisement content from an advertising server. This processing to subscribe to an advertising server, such as the advertising server 118, is detailed further below. The process 400 configures a subscription for the requesting inventory management device at block 406. At block 408, the process 400 sends a subscription confirmation to the requesting inventory management device.

In response to sending the subscription confirmation to the requesting inventory management device at block 408, or in response to determining at decision point 402 that a request to subscribe to advertisement content has not been detected, the process 400 makes a determination as to whether to subscribe to advertisement content from an advertising server, such as the advertising server 118, at decision point 410. A determination to subscribe to advertisement content from an advertising server may be made, for example, in response to one or more subscription requests configured for inventory management devices. The determination to subscribe to advertisement content from an advertising server may also be made in response to direct configuration of the advertising distribution device by the consumer.

In response to determining at decision point 410 to subscribe to advertising content from an advertising server, the process 400 sends a subscription request to the advertising server at block 412. At decision point 414, the process 400 makes a determination as to whether a confirmation of the subscription request has been received. In response to determining that a confirmation of the subscription request has been received or in response to determining at decision point 410 not to subscribe to advertising content from an advertising server, the process 400 makes a determination at decision point 416 as to whether advertisement content has been received from an advertising server. As described above, advertisement content may be received in association with a subscription or without a subscription for certain distributions of advertisement content.

In response to determining that advertisement content has been received at decision point 416, the process 400 makes a determination at decision point 418 as to whether to filter the received advertisement content, using configured inventory management device subscription information, prior to distributing the advertisement content to inventory management devices within the home environment. In response to determining not to filter the received advertisement content, the process 400 performs a push operation and sends all of the received advertisement contents to inventory management device(s) that are configured to receive advertisement content at block 420. In response to determining to filter the received advertisement content at decision point 418, the process 400 filters the received advertisement content based upon active subscriptions of the inventory management devices at block 422. As described above, the received advertisement content may be filtered based upon category types for goods/products represented within the advertisement content. At block 424, the process 400 performs a push operation and sends the filtered advertisement content to any inventory management device(s) subscribed to the category types represented within the filtered advertisement content. In response to sending all of the advertisement content to inventory management device(s) that are configured to receive advertisement content at block 420 or in response to sending the filtered advertisement content to any inventory management device(s) subscribed to the category types represented within the filtered advertisement content at block 424, or in response to determining at decision point 416 that no advertisement content is been received, the process 400 returns to decision point 402 and iterates as described above.

As such, the process 400 processes subscription requests from inventory management devices. The process 400 also subscribes to one or more advertising servers for distribution of advertisement content (based upon inventory management device subscriptions and/or configuration of the advertising distribution device by consumer). Additionally, the process 400 receives and distributes (e.g., pushes) advertisement content using both subscription and non-subscription based processing.

Figure 5A:
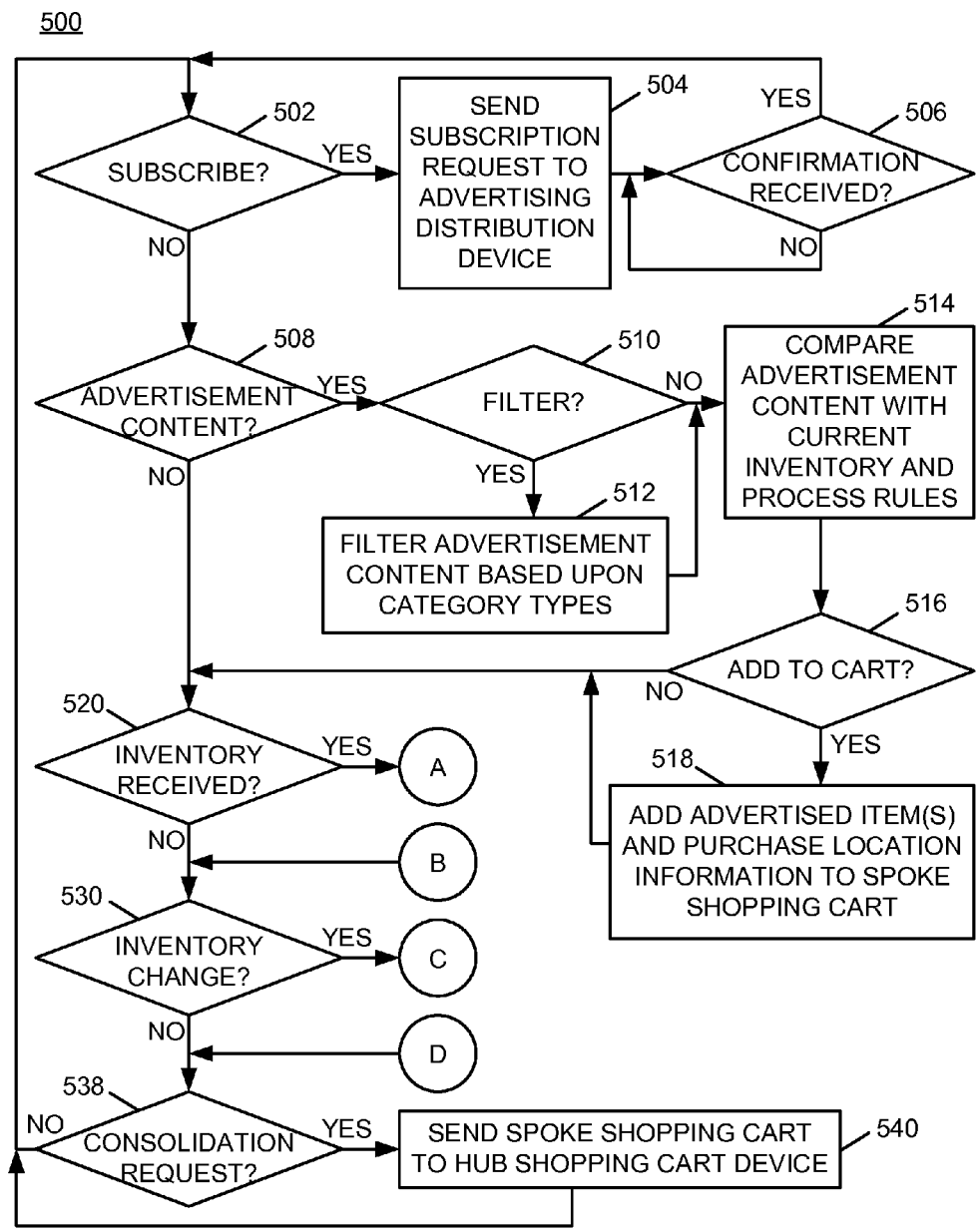
FIG. 5A is a flow chart of an example of an implementation of initial processing within a process for automated synchronization of home shopping carts with advertisements by inventory management devices according to an embodiment of the present subject matter.
Figure 5B:
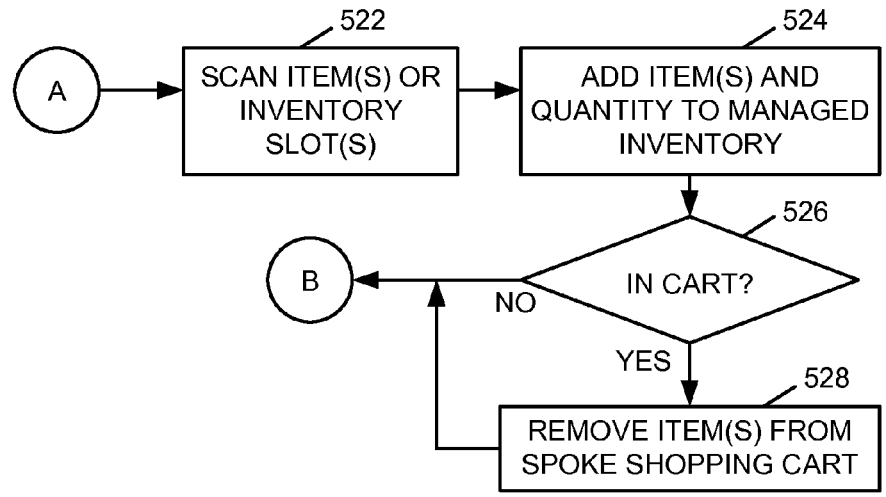
FIG. 5B is a flow chart of an example of an implementation of additional processing within a process for automated synchronization of home shopping carts with advertisements by inventory management devices according to an embodiment of the present subject matter.
Figure 5C:
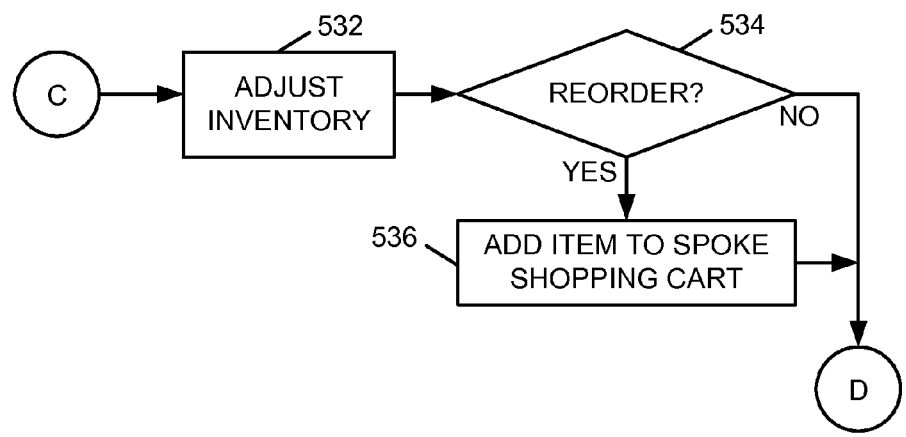
FIG. 5C is a flow chart of an example of an implementation of additional processing within a process for automated synchronization of home shopping carts with advertisements by inventory management devices according to an embodiment of the present subject matter.

FIGS. 5A-5C illustrate a flow chart of an example of an implementation of process 500 for automated synchronization of home shopping carts with advertisements by inventory management devices, such as the inventory management device_1 102 through the inventory management device_N 112. FIG. 5A illustrates initial processing within the process 500. At decision point 502, the process 500 makes a determination as to whether to subscribe to advertisement content from an advertising distribution device, such as the advertising distribution device 114 or the handheld wireless device 120. The determination to subscribe to advertisement content may be based on inventory depletion, new product configuration requests by consumers, or any other event as appropriate for a given implementation.

In response to determining at decision point 502 to subscribe to advertisement content from an advertising distribution device, the process 500 sends a subscription request to the advertising distribution device 114 (or handheld wireless device 120) at block 504. The inventory management devices 102 through 112 may include commodity data and a device identifier within the subscription request that may be used by the advertising distribution device 114 to route advertisement content to the inventory management devices 102 through 112. At decision point 506, the process 500 makes a determination as to whether a confirmation of the subscription has been received from the advertising distribution device 114. In response to determining that a confirmation of the subscription has been received, the process 500 returns to decision point 502 and iterates as described above.

In response to determining at decision point 502 not to subscribe to advertisement content from an advertising distribution device, the process 500 makes a determination as to whether advertisement content has been received from an advertising distribution device at decision point 508. In response to determining that advertisement content has been received, the process 500 makes a determination at decision point 510 as to whether to filter the received advertisement content. As described above, the advertising distribution device 114 may filter received advertisement content prior to sending the advertisement content to the respective inventory management devices 102 through 112 based upon subscriptions to advertisement content. The advertising distribution device 114 may alternatively push advertisement content to the respective inventory management devices 102 through 112 for which a subscription has not been configured. As such, new product advertisements may be received and processed by the inventory management devices 102 through 112 to allow for scalability and growth.

In response to determining at decision point 510 to filter the received advertisement content, the process 500 filters the advertisement content based upon category types configured for the inventory management devices 102 through 112 at block 512. In response to filtering the received advertisement content or in response to determining at decision point 510 not to filter the received advertisement content, the process 500 compares either the received or filtered advertisement content with current inventory and processes rules (e.g., as a rule engine) for addition of items to the spoke shopping carts at block 514. As described above, addition of items to the spoke shopping carts may be performed by a rule engine in the inventory management module 220 that is configured based upon seasonal considerations, product availability, the discount offered, comparison of discounts among multiple vendors, proximity/location of the vendor, and other factors as appropriate for a given implementation. Additionally, items may be added to the spoke shopping carts based upon a determination that the inventory item is at least one of close to expiration, expired, below a configured threshold weight, and below a configured threshold quantity. Further, items may be added to the spoke shopping carts based upon a determination that configured discount data for the inventory item is met by the advertisement content. At decision point 516, the process 500 makes a determination as to whether to add one or more advertised products to the respective spoke shopping carts maintained by the inventory management devices 102 through 112. In response to determining to add one or more advertised products to the spoke shopping cart maintained by the inventory management device, the process 500 adds one or more advertised items and purchase location information extracted from the advertisement content to the spoke shopping cart at block 518.

In response to adding the advertised item(s) and purchase location information to the spoke shopping cart at block 518 or in response to determining at decision point 516 not to add any advertised items to the spoke shopping cart, or in response to determining at decision point 508 that advertisement content has not been received, the process 500 makes a determination at decision point 520 as to whether any inventory has been received for management. In response to determining that inventory has been received for management at decision point 520, the process 500 transitions to the processing shown and described in association with FIG. 5B.

FIG. 5B illustrates additional processing associated with the process 500 for automated synchronization of home shopping carts with advertisements by inventory management devices. At block 522, the process 500 scans each received inventory item or inventory slot within the home appliance. Scanning of each received inventory item or inventory slot within the home appliance may include processing such as scanning each item via a bar-code reader, weighing each item using a scale, or other processing as appropriate for a given implementation to determine the respective inventory item identifiers and a quantity of the respective items to be added to the inventory.

At block 524, the process 500 adds the identified items and quantity to the managed inventory. At decision point 526, the process 500 makes a determination as to whether the received inventory item and quantity is in the spoke shopping cart. In response to determining that the received inventory item and quantity is in the spoke shopping cart, the process 500 removes the respective items (or the quantity received if less than the quantity within the spoke shopping cart) from the spoke shopping cart at block 528. In response to removing the respective items and/or quantity from the spoke shopping cart at block 528 or in response to determining at decision point 526 that the received items are not in the spoke shopping cart, the process 500 transitions back to the processing shown and described in association with FIG. 5A.

In response to returning from the processing described above within FIG. 5B, or in response to determining at decision point 520 that inventory has not been received for management, the process 500 makes a determination as to whether any inventory changes have been detected at decision point 530. An inventory change may be detected, for example, in response to consumption of a product by a consumer (e.g., by detection of a change in weight of the item within a slot of the home appliance), in response to expiration of a perishable item, or otherwise as appropriate for a given implementation. In response to determining that an inventory change has been detected, the process 500 transitions to the processing shown and described in association with FIG. 5C.

FIG. 5C illustrates additional processing associated with the process 500 for automated synchronization of home shopping carts with advertisements by inventory management devices. At block 532, the process 500 adjusts the inventory. At decision point 534, the process 500 makes a determination as to whether to reorder the inventory item. Reordering the inventory item may be based upon a variety of factors, such as seasonal consumption rates (e.g., more ice cream in the summer), or other factors as appropriate for a given implementation. In response to determining to reorder the inventory item at decision point 534, the process 500 adds the item to the spoke shopping cart at block 536. In response to adding the item to the spoke shopping cart at block 536 or in response to determining at decision point 534 not to reorder the inventory item, the process 500 transitions back to the processing shown and described in association with FIG. 5A.

In response to returning from the processing described above within FIG. 5C, or in response to determining at decision point 530 that an inventory change has not been detected, the process 500 makes a determination at decision point 538 as to whether a shopping cart consolidation request has been detected. A shopping cart consolidation request may be detected, for example, in response to the consolidation request being issued by a hub shopping cart device, such as the handheld wireless device 120. In response to determining that a shopping cart consolidation request has been detected, the process 500 sends the spoke shopping cart to the hub shopping cart device at block 540. In response to sending the spoke shopping cart to the hub shopping cart device at block 540, or in response to determining at decision point 538 that a consolidation request has not been received, the process 500 returns to decision point 502 and iterates as described above.

As such, the process 500 manages inventory for an inventory management device, such as the inventory management devices 102 through 112. The process 500 subscribes to advertisement content with an advertising distribution device, processes the received advertisement content, and updates the spoke shopping cart in response to advertisement content configured for reordering. The process 500 processes received inventory and changes to current inventory, and updates the spoke shopping cart in response to inventory changes. The process 500 also responds to spoke shopping cart consolidation requests from a hub shopping cart device.

Figure 6:
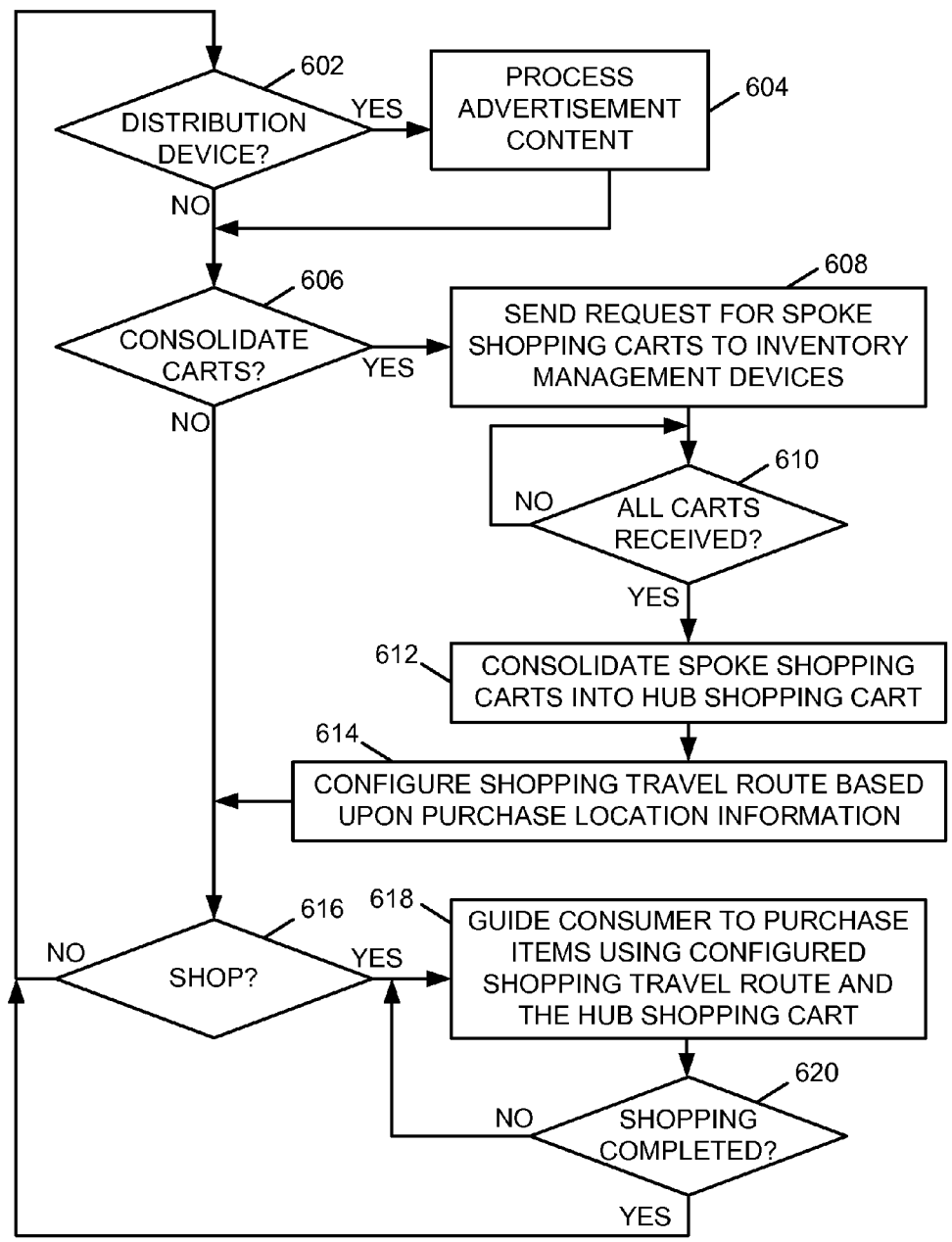
FIG. 6 is a flow chart of an example of an implementation of a process for automated synchronization of home shopping carts with advertisements by a hub shopping cart device according to an embodiment of the present subject matter.

FIG. 6 is a flow chart of an example of an implementation of a process 600 for automated synchronization of home shopping carts with advertisements by a hub shopping cart device, such as the handheld wireless device 120. At decision point 602, the process 600 makes a determination as to whether a hub shopping cart device is also operating as an advertising distribution device, as described above in association with the advertising distribution device 114 and FIG. 4. In response to determining that the hub shopping cart device is also operating as an advertising distribution device, the process 600 processes advertisement content including any subscriptions, as well as the processing described above in association with the process 400 of FIG. 4, at block 604. In response to processing advertisement content at block 604, or in response to determining that the hub shopping cart device is not operating as an advertising distribution device at decision point 602, the process 600 makes a determination at decision point 606 as to whether to consolidate spoke shopping carts from inventory management devices, such as the inventory management device_1 102 through the inventory management device_N 112.

In response to determining at decision point 606 to consolidate spoke shopping carts from the inventory management devices 102 through 112, the process 600 sends a request for spoke shopping carts to the inventory management devices 102 through 112 at block 608. As described above, the consolidation of the spoke shopping carts may be performed by a rule engine in the inventory management module 220 of the handheld mobile device 120 that is configured based upon seasonal considerations, product availability, the discount offered, comparison of discounts among multiple vendors, proximity/location of the vendor, and other factors as appropriate for a given implementation. At decision point 610, the process 600 makes a determination as to whether all spoke shopping carts have been received. In response to determining that all spoke shopping carts have been received, the process 600 consolidates the spoke shopping carts into a hub shopping cart at block 612. At block 614, the process 600 configures a shopping travel route based upon purchase location information for items within the consolidated hub shopping cart. The purchase location information may include global positioning system (GPS) information and map information usable to configure the shopping travel route.

In response to configuring the shopping travel route at block 614 or in response to determining at decision point 606 not to consolidate the spoke shopping carts into the hub shopping cart, the process 600 makes a determination at decision point 616 as to whether a shopping trip has been initiated by the consumer. In response to determining that a shopping trip has been initiated by the consumer, the process 600 guides the consumer to purchase items using the configured shopping travel route and the hub shopping cart at block 618. Guiding the consumer to purchase items using the configured shopping travel route may include scanning items acquired as they are retrieved from shelves within stores or purchased, and removing the respective items from the hub shopping cart. At decision point 620, the process 600 makes a determination as to whether shopping is completed. In response to determining that shopping is not completed, the process 600 returns to block 618 and continues guiding the consumer to purchase the items using the configured shopping travel route and the hub shopping cart, and iterates as described above. In response to determining that shopping is completed at decision point 620 or in response to determining that a shopping trip has not been initiated by the consumer at decision point 616, the process 600 returns to decision point 602 and iterates as described above.

As such, the process 600 allows a hub shopping cart device to also operate as an advertising distribution device as described above in association with FIG. 4. The process 600 consolidates spoke shopping carts into a hub shopping cart and configures a shopping travel route based upon purchase location information associated with commodity data within the advertisement content. The process 600 also guides the consumer using a configured shopping travel route and the hub shopping cart to purchase the respective items on the hub shopping cart.

As described above in association with FIG. 1 through FIG. 6, the example systems, processes, and example markup language provide synchronization of home shopping carts with advertisements. Many other variations and additional activities associated with synchronization of home shopping carts with advertisements are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
  by a processor of a smart home appliance that comprises an inventory area within which inventory commodity items are stored and managed, and that performs automated appliance-specific inventory management of the inventory area of the smart home appliance using at least one integrated inventory sensor of the smart home appliance:
    subscribing, using commodity data of the inventory commodity items sent according to a publish/subscribe mechanism, with an in-home publish/subscribe hub advertising distribution device within a home network to receive advertisements specific to at least one product category of the inventory commodity items managed within the inventory area of the smart home appliance and that are configured programmatically within the smart home appliance for replenishment according to a configured reordering threshold;
    programmatically monitoring, using a communication interface that provides communication capabilities with the at least one integrated inventory sensor, consumption of the inventory commodity items in the at least one managed product category within the inventory area according to inventory measurements provided by the at least one integrated inventory sensor;
    receiving, from the in-home publish/subscribe hub advertising distribution device within the home network responsive to subscribing, subscribed advertisement content specific to the at least one managed product category selectively distributed by the in-home publish/subscribe hub advertising distribution device according to the publish/subscribe mechanism;
    recognizing a purchase opportunity of an advertised item in one of the at least one managed product category within the received subscribed advertisement content based upon the monitoring of the consumption of the inventory commodity items and the programmatically-configured reordering threshold;
    determining purchase availability location information of a store from which to acquire the advertised item, where the purchase availability location information is specified using global positioning satellite (GPS) information of the store from which to acquire the advertised item;
    determining whether to add the advertised item recognized as the purchase opportunity to a locally-stored appliance-specific spoke shopping cart based upon the determined purchase availability location information;
    adding, responsive to an affirmative determination regarding the purchase availability location information, the advertised item recognized as the purchase opportunity to the locally-stored appliance-specific spoke shopping cart; and
    determining travel routing details by which to travel during a shopping trip to a physical location address of the store from which to acquire the advertised item, where the travel routing details comprise GPS information along a travel route to the store from which to acquire the advertised item.

2. The method of claim 1, where receiving, from the in-home publish/subscribe hub advertising distribution device within the home network responsive to subscribing, the subscribed advertisement content specific to the at least one managed product category comprises receiving the subscribed advertisement content as a push operation from the in-home publish/subscribe hub advertising distribution device as part of a subscription established with the in-home publish/subscribe hub advertising distribution device.

3. The method of claim 1, where:
recognizing the purchase opportunity of the advertised item in one of the at least one managed product category within the received subscribed advertisement content based upon the monitoring of the consumption of the inventory commodity items and the programmatically-configured reordering threshold comprises:
 comparing the received subscribed advertisement content with current inventory commodity items referenced by the received subscribed advertisement content and with factors configured within at least one inventory rule and that specify the programmatically-configured reordering threshold; and
 adding the advertised item to the locally-stored appliance-specific spoke shopping cart in further response to determining that at least one of:
  a configured discount within an inventory rule for a current inventory commodity item is met by the advertised item within the received subscribed advertisement content; and
  the current inventory commodity item advertised by the advertised item is at least one of close to expiration, expired, and below one of a configured threshold weight and a configured threshold quantity configured within the inventory rule.

4. The method of claim 1, further comprising:
by the processor of the smart home appliance:
 receiving a subscription acknowledgement from the in-home publish/subscribe hub advertising distribution device in accordance with the in-home publish/subscribe hub advertising distribution device further subscribing, on behalf of the smart home appliance, to receive the advertisements specific to the at least one product category from an advertising server located outside of the home network; and
 where receiving, from the in-home publish/subscribe hub advertising distribution device within the home network responsive to subscribing, the subscribed advertisement content specific to the at least one managed product category comprises receiving filtered advertisement content from the in-home publish/subscribe hub advertising distribution device selectively published by the in-home publish/subscribe hub advertising distribution device to the smart home appliance in accordance with the specified at least one product category.

5. The method of claim 1, where the in-home publish/subscribe hub advertising distribution device comprises one of a set-top-box (STB) and a wireless device, and where the in-home publish/subscribe hub advertising distribution device manages a plurality of subscriptions to advertisement content for different product categories requested by a plurality of smart home appliances.

6. The method of claim 1, further comprising:
by the processor of the smart home appliance:
 receiving a shopping cart consolidation request to send the locally-stored appliance-specific spoke shopping cart to a hub shopping cart device that consolidates appliance-specific spoke shopping carts received from multiple smart home appliances into a hub shopping cart useable by a consumer to shop; and
 sending the locally-stored appliance-specific spoke shopping cart to the hub shopping cart device in response to the shopping cart consolidation request.

7. The method of claim 6, further comprising:
by the processor of the smart home appliance:
 recognizing, within the received subscribed advertisement content, an additional purchase opportunity of a new commodity item type within one of the at least one managed product category; and
 providing the new commodity item type for which the additional purchase opportunity is recognized for consideration by the consumer within the locally-stored appliance-specific spoke shopping cart.

8. A system, comprising:
a memory;
at least one integrated inventory sensor;
an inventory area within which inventory commodity items are stored and managed;
a communication interface that provides communication capabilities with the at least one integrated inventory sensor; and
a processor of a smart home appliance, that performs automated appliance-specific inventory management of the inventory area of the smart home appliance using the at least one integrated inventory sensor of the smart home appliance, programmed to:
 subscribe, using commodity data of the inventory commodity items sent according to a publish/subscribe mechanism, with an in-home publish/subscribe hub advertising distribution device within a home network to receive advertisements specific to at least one product category of the inventory commodity items managed within the inventory area of the smart home appliance and that are configured programmatically within the smart home appliance for replenishment according to a configured reordering threshold;
 programmatically monitor, using the communication interface that provides the communication capabilities with the at least one integrated inventory sensor, consumption of the inventory commodity items in the at least one managed product category within the inventory area according to inventory measurements provided by the at least one integrated inventory sensor;
 receive, from the in-home publish/subscribe hub advertising distribution device within the home network responsive to subscribing, subscribed advertisement content specific to the at least one managed product category selectively distributed by the in-home publish/subscribe hub advertising distribution device according to the publish/subscribe mechanism;
 recognize a purchase opportunity of an advertised item in one of the at least one managed product category within the received subscribed advertisement content based upon the monitoring of the consumption of the inventory commodity items and the programmatically-configured reordering threshold;
 determine purchase availability location information of a store from which to acquire the advertised item, where the purchase availability location information is specified using global positioning satellite (GPS) information of the store from which to acquire the advertised item;
 determine whether to add the advertised item recognized as the purchase opportunity to a locally-stored appliance-specific spoke shopping cart based upon the determined purchase availability location information;

add, responsive to an affirmative determination regarding the purchase availability location information, the advertised item recognized as the purchase opportunity to the locally-stored appliance-specific spoke shopping cart within the memory; and determine travel routing details by which to travel during a shopping trip to a physical location address of the store from which to acquire the advertised item, where the travel routing details comprise GPS information along a travel route to the store from which to acquire the advertised item.

9. The system of claim 8, where in being programmed to receive, from the in-home publish/subscribe hub advertising distribution device within the home network responsive to subscribing, the subscribed advertisement content specific to the at least one managed product category, the processor is programmed to receive the subscribed advertisement content as a push operation from the in-home publish/subscribe hub advertising distribution device as part of a subscription established with the in-home publish/subscribe hub advertising distribution device.

10. The system of claim 8, where:
in being programmed to recognize the purchase opportunity of the advertised item in one of the at least one managed product category within the received subscribed advertisement content based upon the monitoring of the consumption of the inventory commodity items and the programmatically-configured reordering threshold, the processor is programmed to:
compare the received subscribed advertisement content with current commodity inventory items referenced by the received subscribed advertisement content and with factors configured within at least one inventory rule and that specify the programmatically-configured reordering threshold; and
the processor is programmed add the advertised item to the locally-stored appliance-specific spoke shopping cart within the memory in further response to determining that at least one of:
a configured discount within an inventory rule for a current inventory commodity item is met by the advertised item within the received subscribed advertisement content; and
the current inventory commodity item advertised by the advertised item is at least one of close to expiration, expired, and below one of a configured threshold weight and a configured threshold quantity configured within the inventory rule.

11. The system of claim 8, where the processor is further programmed to:
receive a subscription acknowledgement from the in-home publish/subscribe hub advertising distribution device in accordance with the in-home publish/subscribe hub advertising distribution device further subscribing, on behalf of the smart home appliance, to receive the advertisements specific to the at least one product category from an advertising server located outside of the home network; and
where, in being programmed to receive, from the in-home publish/subscribe hub advertising distribution device within the home network responsive to subscribing, the subscribed advertisement content specific to the at least one managed product category, the processor is programmed to receive filtered advertisement content from the in-home publish/subscribe hub advertising distribution device selectively published by the in-home publish/subscribe hub advertising distribution device to the smart home appliance in accordance with the specified at least one product category.

12. The system of claim 8, where the in-home publish/subscribe hub advertising distribution device comprises one of a set-top-box (STB) and a wireless device, and where the in-home publish/subscribe hub advertising distribution device manages a plurality of subscriptions to advertisement content for different product categories requested by a plurality of smart home appliances.

13. The system of claim 8, where the processor is further programmed to:
recognize, within the received subscribed advertisement content, an additional purchase opportunity of a new commodity item type within one of the at least one managed product category;
provide the new commodity item type for which the additional purchase opportunity is recognized for consideration by the consumer within the locally-stored appliance-specific spoke shopping cart;
receive a shopping cart consolidation request to send the locally-stored appliance-specific spoke shopping cart to a hub shopping cart device that consolidates appliance-specific spoke shopping carts received from multiple smart home appliances into a hub shopping cart useable by a consumer to shop; and
send the locally-stored appliance-specific spoke shopping cart to the hub shopping cart device in response to the shopping cart consolidation request.

14. A computer program product comprising a computer readable storage medium including computer readable program code, where the computer readable program code when executed on a computer of a smart home appliance, that comprises an inventory area within which inventory commodity items are stored and managed, and that performs automated appliance-specific inventory management of the inventory area of the smart home appliance using at least one integrated inventory sensor of the smart home appliance, causes the computer to:
subscribe, using commodity data of the inventory commodity items sent according to a publish/subscribe mechanism, with an in-home publish/subscribe hub advertising distribution device within a home network to receive advertisements specific to at least one product category of the inventory commodity items managed within the inventory area of the smart home appliance and that are configured programmatically within the smart home appliance for replenishment according to a configured reordering threshold;
programmatically monitor, using a communication interface that provides communication capabilities with the at least one integrated inventory sensor, consumption of the inventory commodity items in the at least one managed product category within the inventory area according to inventory measurements provided by the at least one integrated inventory sensor;
receive, from the in-home publish/subscribe hub advertising distribution device within the home network responsive to subscribing, subscribed advertisement content specific to the at least one managed product category selectively distributed by the in-home publish/subscribe hub advertising distribution device according to the publish/subscribe mechanism;
recognize a purchase opportunity of an advertised item in one of the at least one managed product category within the received subscribed advertisement content based upon the monitoring of the consumption of the inventory commodity items and the programmatically-configured reordering threshold;

determine purchase availability location information of a store from which to acquire the advertised item, where the purchase availability location information is specified using global positioning satellite (GPS) information of the store from which to acquire the advertised item;

determine whether to add the advertised item recognized as the purchase opportunity to a locally-stored appliance-specific spoke shopping cart based upon the determined purchase availability location information;

add, responsive to an affirmative determination regarding the purchase availability location information, the advertised item recognized as the purchase opportunity to the locally-stored appliance-specific spoke shopping cart; and determine travel routing details by which to travel during a shopping trip to a physical location address of the store from which to acquire the advertised item, where the travel routing details comprise GPS information along a travel route to the store from which to acquire the advertised item.

15. The computer program product of claim 14, where in causing the computer to receive, from the in-home publish/subscribe hub advertising distribution device within the home network responsive to subscribing, the subscribed advertisement content specific to the at least one managed product category, the computer readable program code when executed on the computer causes the computer to receive the subscribed advertisement content as a push operation from the in-home publish/subscribe hub advertising distribution device as part of a subscription established with the in-home publish/subscribe hub advertising distribution device.

16. The computer program product of claim 14, where:
in causing the computer to recognize the purchase opportunity of the advertised item in one of the at least one managed product category within the received subscribed advertisement content based upon the monitoring of the consumption of the inventory commodity items and the programmatically-configured reordering threshold, the computer readable program code when executed on the computer causes the computer to:
compare the received subscribed advertisement content with current inventory commodity items referenced by the received subscribed advertisement content and with factors configured within at least one inventory rule and that specify the programmatically-configured reordering threshold; and the computer readable program code when executed on the computer causes the computer to add the advertised item to the locally-stored appliance-specific spoke shopping cart in further response to determining that at least one of:
a configured discount within an inventory rule for a current inventory commodity item is met by the advertised item within the received subscribed advertisement content; and
the current inventory commodity item advertised by the advertised item is at least one of close to expiration, expired, and below one of a configured threshold weight and a configured threshold quantity configured within the inventory rule.

17. The computer program product of claim 14, where the computer readable program code when executed on the computer further causes the computer to:
receive a subscription acknowledgement from the in-home publish/subscribe hub advertising distribution device in accordance with the in-home publish/subscribe hub advertising distribution device further subscribing, on behalf of the smart home appliance, to receive the advertisements specific to the at least one product category from an advertising server located outside of the home network; and where in causing the computer to receive, from the in-home publish/subscribe hub advertising distribution device within the home network responsive to subscribing, the subscribed advertisement content specific to the at least one managed product category, the computer readable program code when executed on the computer causes the computer to receive filtered advertisement content from the in-home publish/subscribe hub advertising distribution device selectively published by the in-home publish/subscribe hub advertising distribution device to the smart home appliance in accordance with the specified at least one product category.

18. The computer program product of claim 14, where the in-home publish/subscribe hub advertising distribution device comprises one of a set-top-box (STB) and a wireless device, and where the in-home publish/subscribe hub advertising distribution device manages a plurality of subscriptions to advertisement content for different product categories requested by a plurality of smart home appliances.

19. The computer program product of claim 14, where the computer readable program code when executed on the computer further causes the computer to:
receive a shopping cart consolidation request to send the locally-stored appliance-specific spoke shopping cart to a hub shopping cart device that consolidates appliance-specific spoke shopping carts received from multiple smart home appliances into a hub shopping cart useable by a consumer to shop; and
send the locally-stored appliance-specific spoke shopping cart to the hub shopping cart device in response to the shopping cart consolidation request.

20. The computer program product of claim 19, where the computer readable program code when executed on the computer further causes the computer to:
recognize, within the received subscribed advertisement content, an additional purchase opportunity of a new commodity item type within one of the at least one managed product category; and
provide the new commodity item type for which the additional purchase opportunity is recognized for consideration by the consumer within the locally-stored appliance-specific spoke shopping cart.

* * * * *